United States Patent
Rehkemper et al.

(10) Patent No.: US 6,758,436 B2
(45) Date of Patent: Jul. 6, 2004

(54) PNEUMATIC DRIVEN PROPELLER RELATED VEHICLES

(75) Inventors: Jeffrey Rehkemper, Chicago, IL (US); Keith Johnson, Des Plaines, IL (US)

(73) Assignee: Rehco, LLC, Chicago, IL (US)

( * ) Notice: Subject to any disclaimer, the term of this patent is extended or adjusted under 35 U.S.C. 154(b) by 0 days.

(21) Appl. No.: 10/277,844

(22) Filed: Oct. 23, 2002

(65) Prior Publication Data

US 2003/0111575 A1 Jun. 19, 2003

Related U.S. Application Data

(63) Continuation-in-part of application No. 10/189,681, filed on Jul. 8, 2002, now Pat. No. 6,659,395.
(60) Provisional application No. 60/348,891, filed on Jan. 14, 2002, and provisional application No. 60/337,670, filed on Nov. 7, 2001.

(51) Int. Cl.[7] ............................................. B64C 27/12
(52) U.S. Cl. ................... 244/17.11; 446/37; 244/17.19
(58) Field of Search ................... 244/17.11, 17.19, 244/62, 53 R; 446/39, 40, 41, 42, 43, 44, 45; 416/80, 139; 336/13, 264

(56) References Cited

U.S. PATENT DOCUMENTS

| | | | | |
|---|---|---|---|---|
| 2,650,667 A | * | 9/1953 | Young | 416/131 |
| 3,391,746 A | * | 7/1968 | Cardoso et al. | 416/128 |
| 4,728,311 A | * | 3/1988 | Magers | 446/228 |
| 4,781,642 A | * | 11/1988 | Stanzel | 446/38 |
| 5,080,624 A | * | 1/1992 | Brinker | 446/48 |
| 6,006,517 A | * | 12/1999 | Kownacki et al. | 60/370 |
| 6,086,016 A | * | 7/2000 | Meek | 244/17.11 |

* cited by examiner

*Primary Examiner*—Peter M. Poon
*Assistant Examiner*—T. D. Collins

(57) ABSTRACT

A propeller related vehicle in accordance with one embodiment of the present invention is described as a helicopter having an airframe housing a pneumatic motor mechanism for powering a main propeller attached to a main drive shaft. The helicopter further includes a horizontal stabilizing means attached between the main propeller and the main drive shaft, which permits the main propeller to freely pivot about the main drive shaft independently from the airframe. As such when the main propeller is rotating and the main propeller begins to pitch, the rotating main propeller has a centrifugal force created by the rotation thereof and will tend to pivot about the horizontal stabilizing means in a manner that offsets the pitch such that the helicopter remains in a substantially horizontal position.

15 Claims, 6 Drawing Sheets

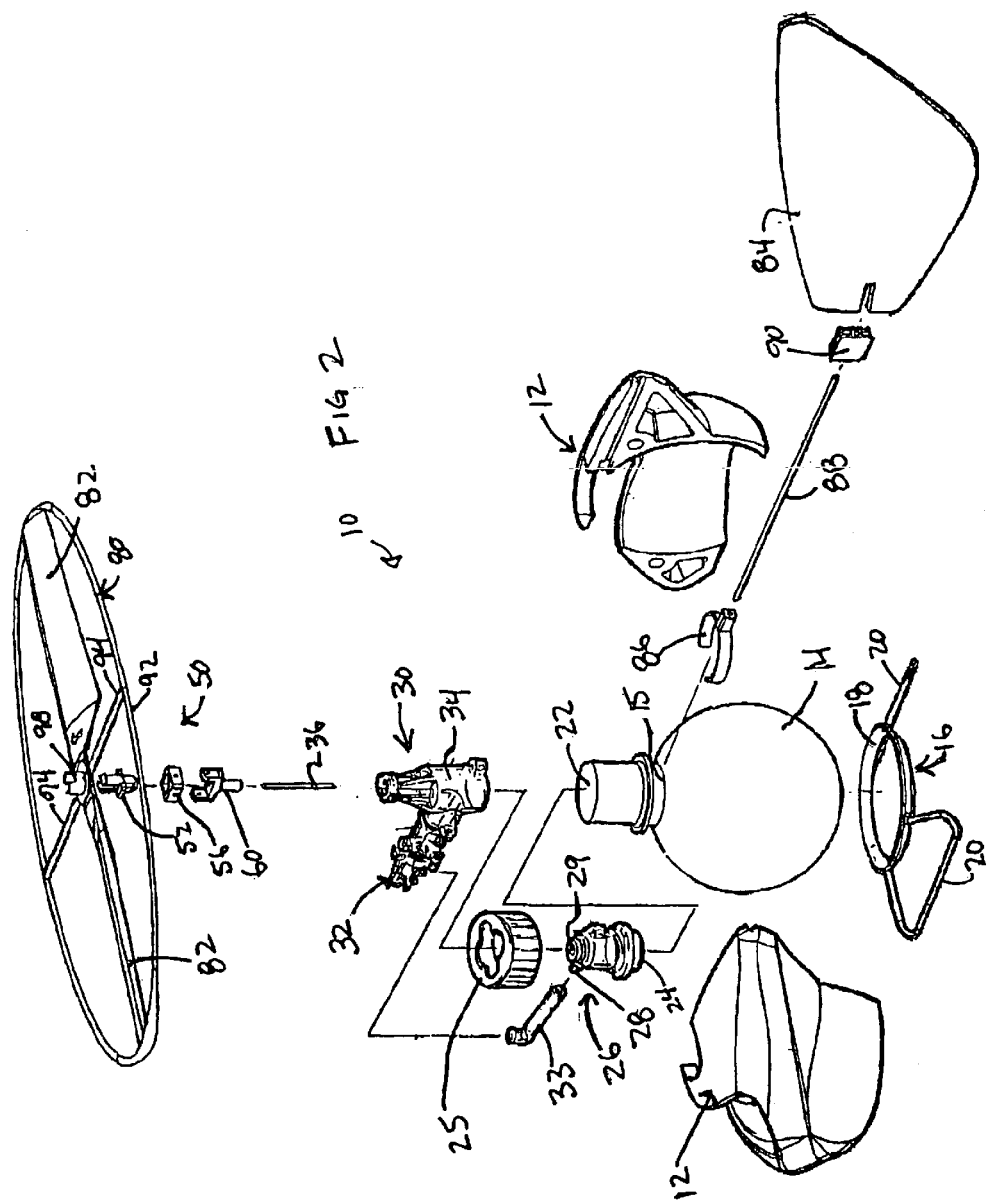

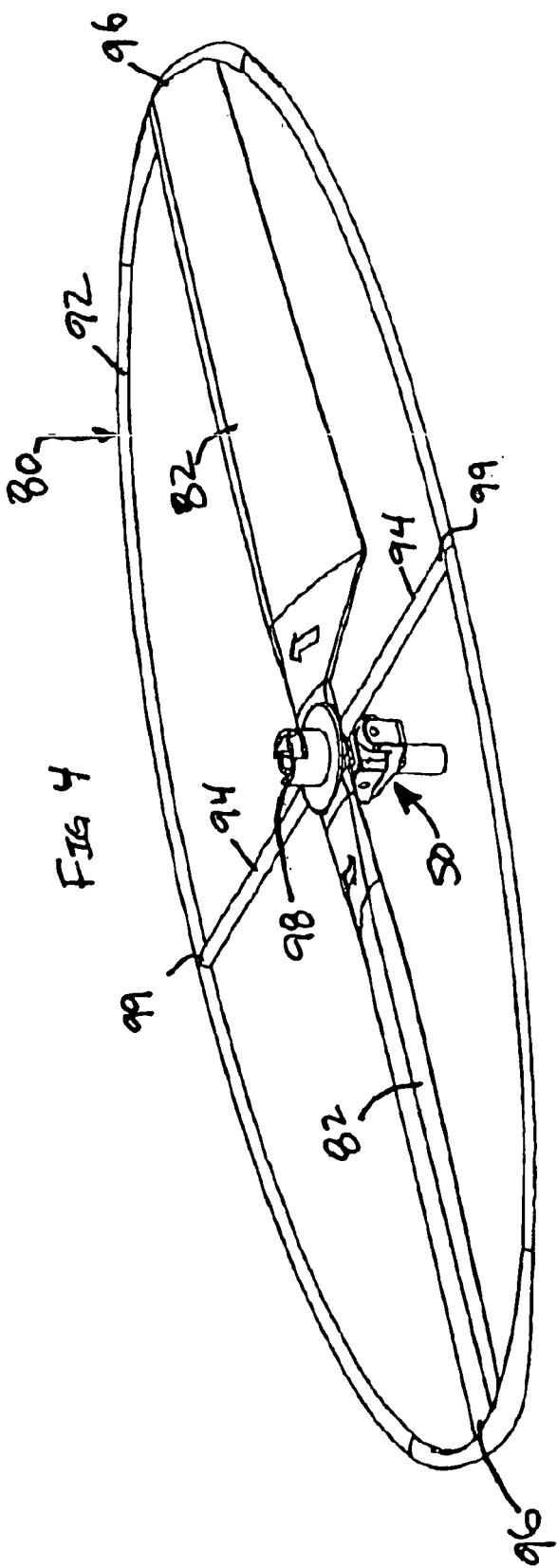

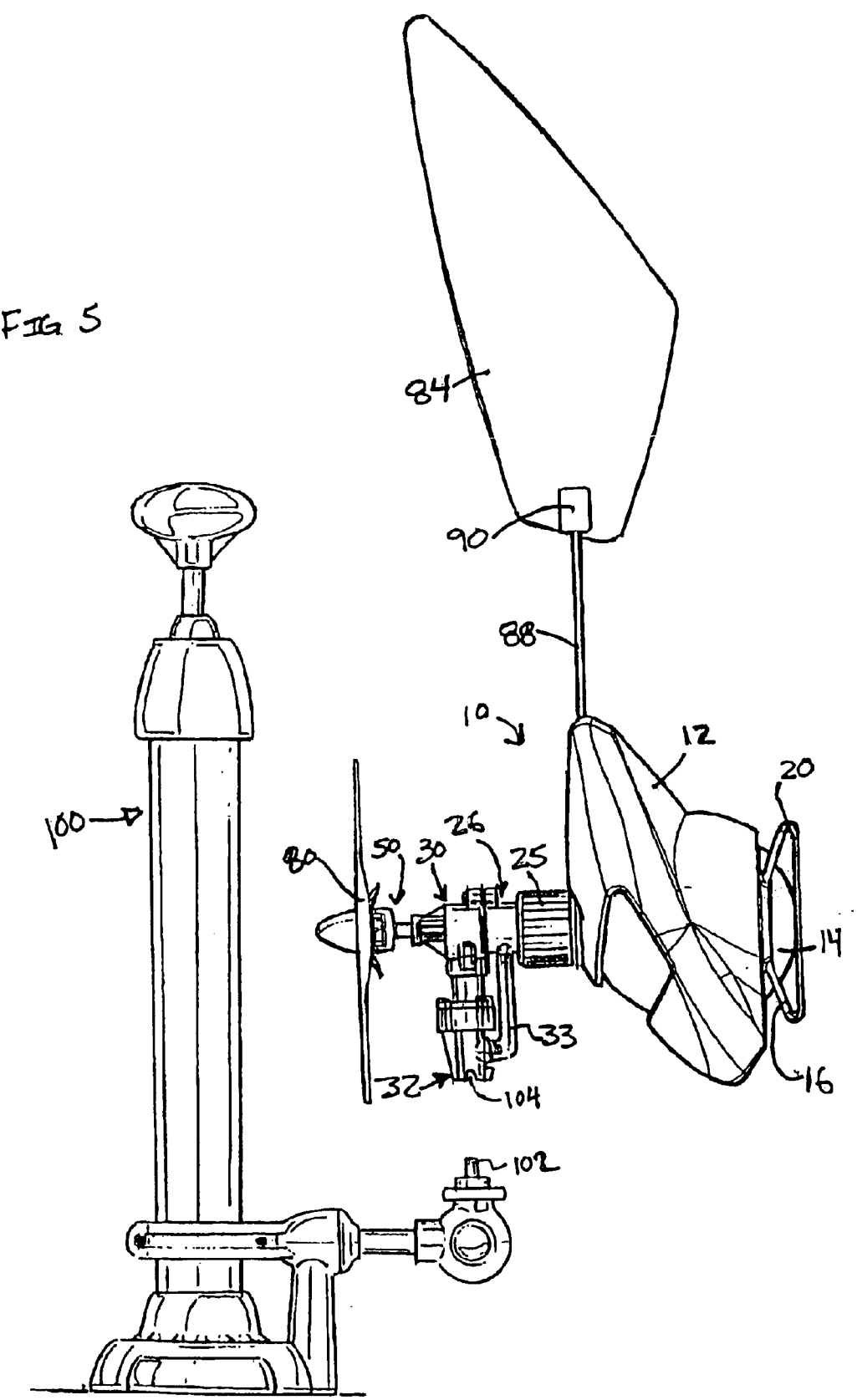

PNEUMATIC DRIVEN PROPELLER RELATED VEHICLES

CROSS-REFERENCE TO RELATED APPLICATIONS

This application claims the benefit of U.S. Provisional Patent Application having Ser. No. 60/337,670 and filed on Nov. 7, 2001 and claims the benefit of U.S. Provisional Patent Application having Ser. No. 60/348,891 and filed on Jan. 14, 2002 and hereby incorporates both provisional applications by reference.

This application is also a continuation in part application of U.S. application Ser. No. 10/189,681 filed Jul. 8, 2002 now U.S. Pat. No. 6,659,395 and hereby incorporates the application by reference.

FIELD OF THE INVENTION

This invention relates generally to propellers and propeller related vehicles and more particular to vehicles, such as air, land and water vehicles, that use or incorporate propellers to create lift or as a means for propulsion, and for most aspects the present invention relate to air based vehicles designed for the toy or hobby industry.

BACKGROUND OF THE INVENTION

While the present invention is related in part to vehicles developed in the toy and hobby industry. There are many types of vehicles that use propellers as a source of lift or as a means for propulsion. The more common types of these vehicles are air/space based vehicles such as airplanes, helicopters, or unconventional aircraft. In general such aircraft require complex programming and mechanics to control the flight path and are especially difficult to control. In most instances, controlling these aircraft to fly in a stable horizontal position takes countless hours of practice.

Examples of these prior art aircraft may be found in the following U.S. patents; U.S. Pat. No. 5,609,312 is directed to a model helicopter that describes an improved fuselage with a structure that supports radio-control components, and drive train components in an attempt to provide a simple structure; U.S. Pat. No. 5,836,545 is directed to a rotary wing model aircraft that includes a power distribution system that efficiently distributes engine power to the rotary wings and tail rotor system; U.S. Pat. No. 5,879,131 is directed to a main propeller system for model helicopters that are capable of surviving repeated crashes; and U.S. Pat. No. 4,604,075 is directed to a toy helicopter that includes a removable control unit, which a user may plug into the toy helicopter.

These toys use at least one propeller rotating in a substantially horizontal plane to create and sustain lift. One problem that arises is when the propellers are rotating in the horizontal plane, variations such as wind or power fluctuations may cause the propeller blades to pitch, which further causes the aircraft to tip, turn, oscillate or bank. This effect may be compensated for and corrected with complicated programming and mechanics. However, as mentioned above these have a tendency to make the aircraft too expensive or too difficult to control, especially for children. The ability to even maintain horizontal stability in these aircrafts is extremely difficult.

As such a need exists to improve these aircrafts that utilize propellers to create and sustain lift to overcome the problems identified above. Such a need should be inexpensive and easy to implement. The outcome should further provide for aircrafts that are easy to control or manipulate without the need for complex linkages, servos, gyros or other electromechanical devices.

There is also a continuing need to create vehicles that use alternate means for powering or driving the propellers. One such alternative means would be a pneumatic engine that runs off of pressurized fluid. In addition thereto, there is also an need to make the toy and hobby aircraft safer. Oftentimes a child or user is injured when the user comes in contact with a rotating propeller, as such there exists a further need to make the propellers safer.

SUMMARY OF THE INVENTION

A pneumatically driven propelled vehicle in accordance with one embodiment of the present invention is described as a helicopter having an airframe that houses a pneumatic motor mechanism, which is used to power a main propeller. A user can attach an external pump to an intake manifold defined on the pneumatic motor mechanism in order to pump and pressurize air inside of a reservoir. A pneumatic motor utilizing the pressurized air is used to rotate a main drive shaft. A horizontal stabilizing means is attached between the main propeller and a main drive shaft. The horizontal stabilizing means permits the main propeller to rotate and freely pivot about the main drive shaft independently from the airframe. As such when the main propeller is rotating and the main propeller begins to pitch, a centrifugal force created by the rotation of the main propeller, tends to pivot the main propeller about the horizontal stabilizing means in a manner that offsets the pitch such that the helicopter remains in a substantially horizontal position.

Numerous advantages and features of the invention will become readily apparent from the following detailed description of the invention and the embodiments thereof, and from the accompanying drawings.

BRIEF DESCRIPTION OF THE DRAWINGS

A fuller understanding of the foregoing may be had by reference to the accompanying drawings, wherein:

FIG. 2 is a reverse exploded view of FIG. 1;

FIG. 3b is an exploded view of FIG. 3a;

FIG. 4 is a perspective view of the main propeller in accordance with the present invention;

FIG. 5 is side view of a pump and the pneumatic powered helicopter of FIG. 1;

DETAILED DESCRIPTION OF THE INVENTION

Figure 1:
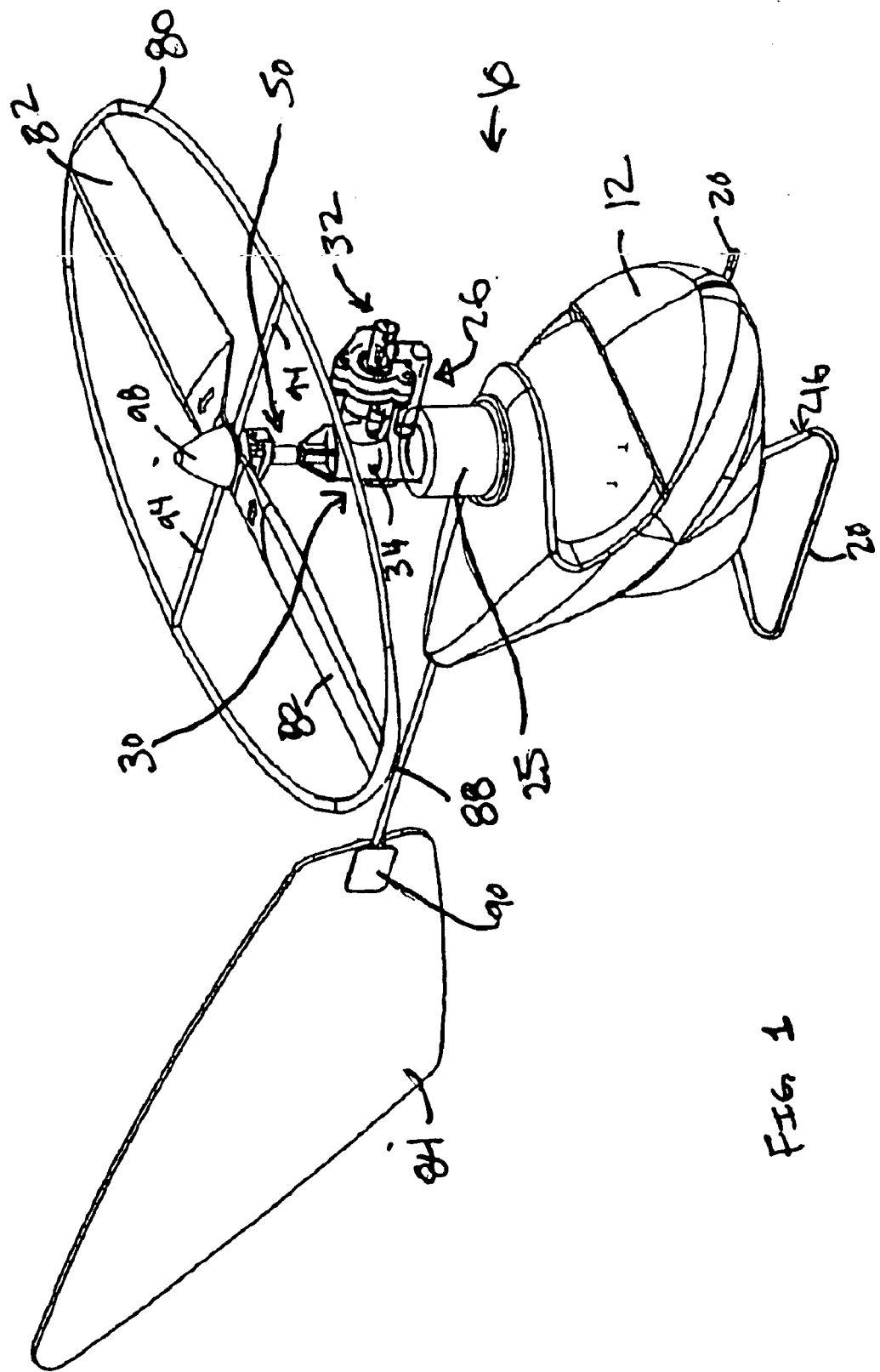
FIG. 1 is a perspective view of a pneumatically driven vehicle in accordance with the present invention illustrating a pneumatic powered helicopter with a main propeller attached to a horizontal stabilizing means.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

Referring now to FIGS. 1 and 2, a propeller related vehicle is illustrated in but one embodiment of the present invention as a helicopter 10. The present embodiment includes an outer housing 12 that houses a reservoir 14 to hold a pressurized fluid. The reservoir 14 is secured to or rests upon a chassis 16, which has an upper portion 18 that is secured within the housing 12. Also attached to the chassis 16 are landing skids 20 such that the helicopter 10 may rest on a given surface.

As illustrated in the present invention in FIG. 2, the reservoir 14 includes an open end 22 that receives one end 24 of an inlet assembly 26. The inlet assembly 26 is secured to the open end 22 by a cap 25. A pneumatic motor mechanism 30 includes an intake manifold 32 that may be attached to an outside pump (shown in FIG. 5). The air entering the intake manifold 32 will first pass through a tube 33 that is attached to a first opening 28 defined in the inlet assembly 26 and then passes into the reservoir 14 via its open end 22. As the user continues to force or pump air into the reservoir 14 the air inside the reservoir 14 will then pressurize. A pneumatic motor 34 secured to the intake manifold 32 is also in fluid communication with the reservoir 14 via a second opening 29 defined in the inlet assembly 26. The air flow entering and exiting the reservoir 14 is controlled through various well known valves (not shown) contained in the intake manifold 32, the pneumatic motor 34 and/or the inlet assembly 26. The pneumatic motor 34 uses the pressurized fluid contained in the reservoir 14 to rotate a main drive shaft 36.

Figure 3B:
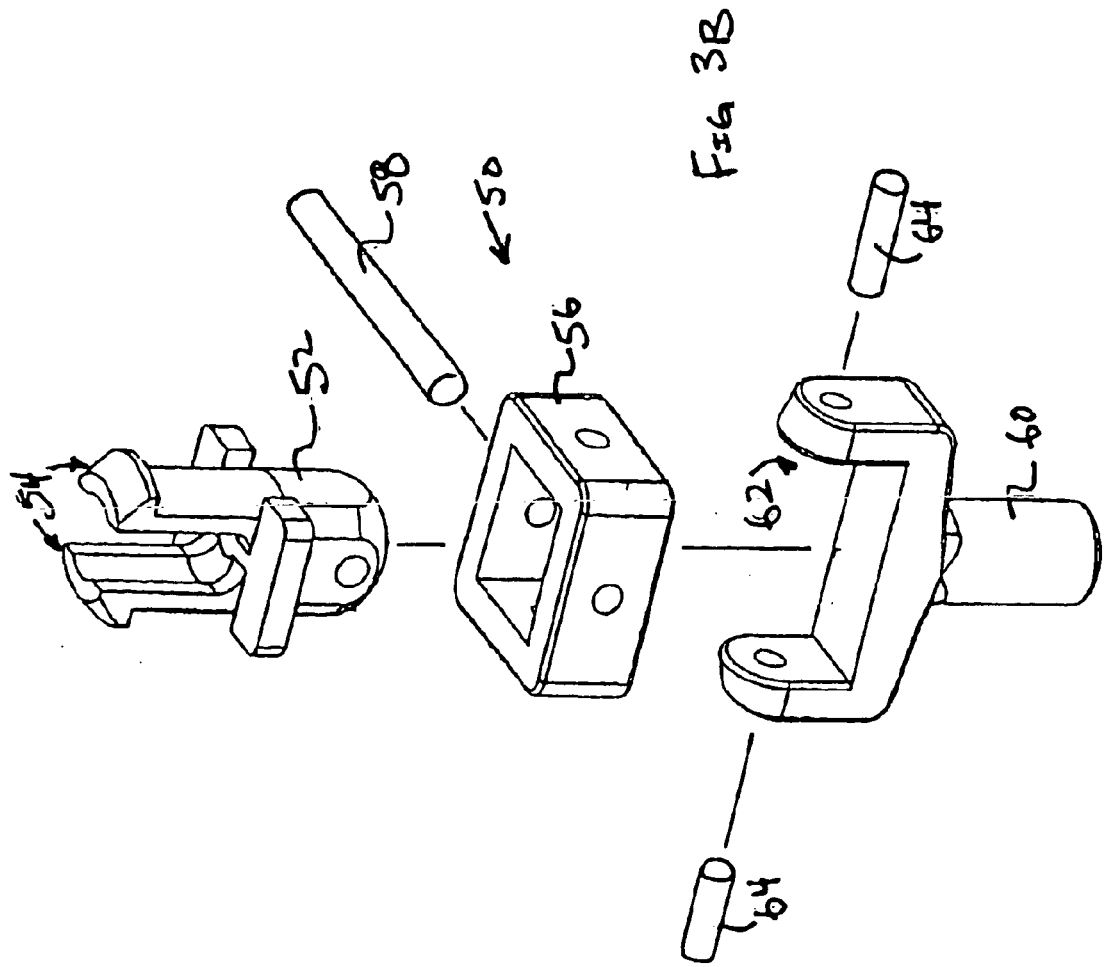
Figure 3A:
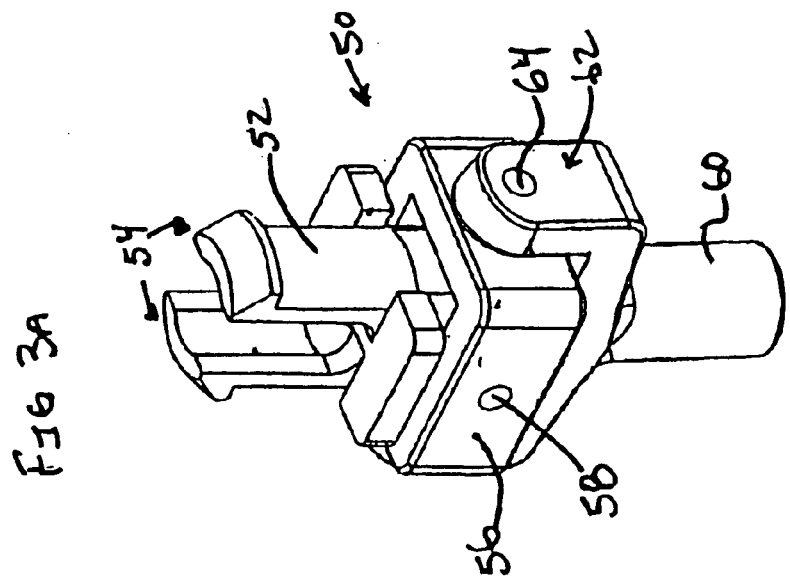
FIG. 3a is a close-up view of the horizontal stabilizing means.

The main drive shaft 36 is connected to the horizontal stabilizing means 50, which is further connected or secured to the main propeller 80. Referring now to FIGS. 3a and 3b, the horizontal stabilizing means 50 includes a freely pivotal rotor attachment 52 that permits the main propeller 80 to pivot about its center of rotation. In addition, the rest of the helicopter 10 below the rotor attachment 52, as defined below can pivot as a pendulum. The rotor attachment 52 includes clips 54 to frictionally engage a center portion of the propeller 80. The rotor attachment 52 is pivotally attached to a pivot joint 56 by a first pivot pin 58, which permits the rotor attachment 52 to pivot in a first pivot direction. The pivot joint 56 is also secured to a U-shaped portion 62, defined by a yoke 60, by a pair of pivot pins 64 and in a second pivot direction.

It is important to note that the main propeller 80 is preferably mounted to the rotor attachment 52 such that the main propeller blades 82 are parallel to the first pivot direction about the first pivot pin 58. This allows the main propeller 80 to pivot in the same direction as the blades 82, so the blades 82 when pitching or banking help self-regulate the main propeller 80. Furthermore, the first and second pivot directions are preferably perpendicular to each other to allow the main propeller 80 to pivot perpendicularly from the helicopter 10.

Also attached to the helicopter 10 is a vertical rudder 84, which as illustrated in FIGS. 1 and 2. The rudder 84 is clipped onto a neck 15, defined on the reservoir 14. The reservoir clip 86 is attached to a horizontal beam 88 that extends outwardly. The beam 88 is secured to a rudder clip 90 that attaches to the vertical rudder 84.

Referring now to FIG. 4, the main propeller 80 includes a pair of blades 82 that extend outwardly from a center support 98. A pair of cross bars 94 also extend outwardly from the center support 98 and are perpendicular to the blades 82. To protect a user from and to protect the blades and crossbars when they are rotating a circular safety ring 92 is secured to the ends 96 of the blades 82 and the ends 99 of the crossbars 94.

When the main propeller 80 rotates, the rotating main propeller 80 with the weight of the safety ring 92 and crossbars 94 creates a normal centrifugal force. If the main propeller 80 begins to pitch the horizontal stabilizing means 50 along with this normal centrifugal force creates a gyroscopic effect that causes the main propeller 80 to level out. The leveling out effect is achieved when the main propeller 80 begins to pivot about the first pivot direction. The main propeller 80 will pivot along a changing pitch (created in the gyroscopic effect) such that the main propeller 80 returns to rotating in a substantially horizontal plane; thereby stabilizing the helicopter 10 horizontally, keeping it level. Similarly, if the body of the helicopter 10 (below the horizontal stabilizing means 50) begins to sway, the horizontal stabilizing mean 50 will similarly compensate and return the helicopter 10 to a substantially horizontal position. As such, the present invention provides a novel mechanical means for compensating for any change in the horizontal position of the helicopter without the need for expensive servos and programming.

During operation, the present invention will allow the helicopter 10 to lift straight up and maintain a hover or stationary position. The helicopter 10 may include several forms of control, starting with no control or "free flight," or it may be outfitted with electronics having a microprocessor for "preprogrammed" or "programmable" flight or it may be outfitted with a radio receiver for use with a hand held remote transmitter or it may be any combination of the above.

To operate the helicopter 10, a user must first fill the reservoir 14 with pressurized air. The user may use an external pump 100, such as illustrated in FIG. 5, by securing an outlet 102 defined by the pump 100 to an inlet 104 on the intake manifold 32. The user may then begin to pump air into and pressurize air contained in the reservoir 14. Once the reservoir 14 contains a sufficient amount of pressurized air, the user detaches the helicopter 10 from the pump 100 and initiates the pneumatic motor 34 by initially rotating the main propeller 80. However, it could be contemplated that the main propeller 80 will start automatically once the reservoir 14 contains pressurized fluid. The helicopter 10 will use the pressurize fluid to rotate the main propeller 80 and lift off of the ground or away from the user. In free flight, the helicopter 10 will continue to rise and maintain a substantially horizontal orientation without banking or pitching too much because of the horizontal stabilizing means. Once the fluid inside the reservoir 14 is depleted, the propeller 80 will continue to rotate slower and slower as the momentum decreases. This permits the helicopter 10 to glide back down to the ground.

Figure 6:
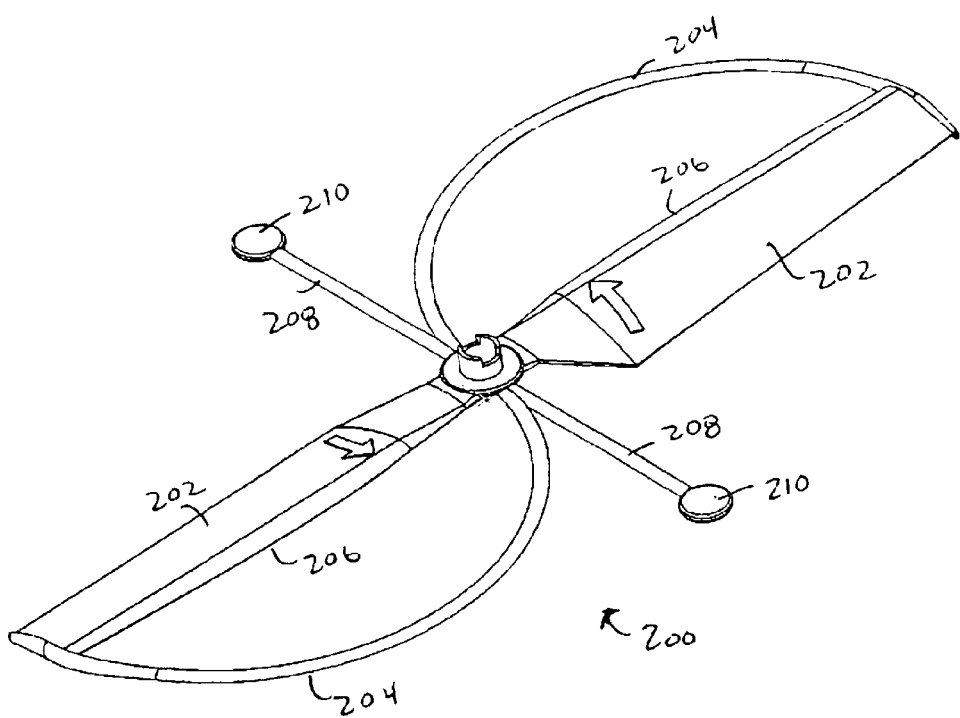
FIG. 6 is a second main propeller in accordance with another embodiment of the present invention.

Referring now to FIG. 6, a second main propeller 200 is illustrated and which may be used with the present invention. The second main propeller 200 is attached to the helicopter 10 via the horizontal stabilizing means 50. The second main propeller 200 includes a pair of opposing blades 202 with safety arcs 204, either elliptical or circular, in front of the leading edges 206 of both blades 202. In addition, extending outwardly from the center of the second main propeller 200 is a pair of fly bars 208 with weighted ends 210. The fly bars 208 add extra stability to the second main propeller 200 and also reduce the effect wind may have on the second main propeller 200. When the second main propeller 200 is rotating, centrifugal force pulls the weighted ends 210 of the fly-bars 208 straight out, making the second main propeller 200 more stable by reducing the amount the second main propeller 200 may pivot during operation.

The present invention is also applicable for an aircraft having one or more propellers that rotate in a horizontal plane. The aircraft would typically have an airframe for housing a reservoir that is used by a single pneumatic motor to rotate a plurality of drive shafts, each corresponding to a propeller. Alternatively, the reservoir could be used by a plurality of pneumatic motors or it is even contemplated that the airframe of the aircraft would house multiple reservoirs, each used by a corresponding pneumatic motor. The aircraft also includes a horizontal stabilizing means attached between each propeller and the corresponding drive shaft, which permits the propeller to freely pivot about the corresponding drive shaft independently from the airframe. As such when a propeller that is rotating begins to pitch, the rotating propeller has a centrifugal force created by the rotation thereof that tends to pivot the propeller about the horizontal stabilizing means in a manner that offsets the pitch such that the aircraft remains in a substantially horizontal position.

From the foregoing and as mentioned above, it will be observed that numerous variations and modifications may be effected without departing from the spirit and scope of the novel concept of the invention. For example, the propeller, while shown may be used in airplanes, may find further applications in other propeller driven vehicles, either miniature or life-size, such as but not limited to water driven vehicles (such as boats and submarines), land driven vehicles (such as propeller operated cars) and other air driven vehicles (such as rockets) as well as other products that use propellers. It is to be understood that no limitation with respect to the specific methods and apparatus illustrated herein is intended or should be inferred.

We claim:

1. A helicopter comprising:
    an airframe housing at least a reservoir;
    a means to refill and pressurize air inside the reservoir;
    a pneumatic motor mechanism that utilizes pressurized air inside the reservoir to rotate a main drive shaft;
    a main propeller that is rotated by the main drive shaft; and
    a horizontal stabilizing means attached between the main propeller and the main drive shaft, which permits the main propeller to freely pivot about the main drive shaft independently from the airframe, wherein when the main propeller is rotating and the main propeller begins to pitch, the rotating main propeller will tend to pivot about the horizontal stabilizing means in a manner that offsets the pitch such that the helicopter remains in a substantially horizontal position; and
    wherein the horizontal stabilizing means includes a rotor attachment that attaches directly to the main propeller, the rotor attachment includes a lower end that is pivotally connected within a joint in a first pivot direction such that when the rotor attachment pivots a predetermined amount with respect to the joint an outside surface defined by the rotor attachment will come into contact with an inside surface defined by the joint thereby preventing the rotor attachment from pivoting more than said predetermined amount; the horizontal stabilizing means further includes a yoke pivotally attached to the joint in a second pivot direction that is different than the first pivot direction and the yoke is secured to the main drive shaft.

2. The helicopter of claim 1, wherein the pneumatic motor mechanism includes:
    an intake manifold in communication with the reservoir, the intake manifold permits air to enter into the reservoir from an outside source, and
    a pneumatic motor in communication with the reservoir and the main drive shaft, the pneumatic motor utilizes pressurized air from the reservoir to rotate the main drive shaft.

3. The helicopter of claim 2, further comprising an external pumping means that is attachable to the intake manifold for pumping air into and pressurizing air inside the reservoir.

4. The helicopter of claim 1, wherein the first pivot direction is perpendicular to the second pivot direction.

5. The helicopter of claim 1, wherein the main propeller includes:
    a center support defined about the horizontal stabilizing means;
    a pair of blades extending outwardly from the center support, each blade having an end distal to the horizontal stabilizing means;
    a pair of crossbars extending outwardly from the center support and perpendicularly from the blades, each crossbar have an end distal from the center support; and
    a safety ring attached to the distal ends of each blade and crossbar.

6. The helicopter of claim 4, wherein the main propeller includes at least a pair of blades that extend outwardly from the horizontal stabilizing means such that the pair of blades pivot about the horizontal stabilizing means in the first pivotal direction.

7. An aircraft having a pneumatic motor mechanism for powering a horizontal orientated propeller, the propeller is attached to a drive shaft that is rotated by said pneumatic motor mechanism, the aircraft further comprising a horizontal stabilizing means attached between the propeller and the drive shaft, which permits the propeller to freely pivot about the drive shaft independently from the airframe, and wherein when said propeller is rotating and said rotating propeller begins to pitch, the rotating propeller will tend to pivot about the horizontal stabilizing means in a manner that offsets the pitch such that the aircraft remains in a substantially horizontal position, and
    wherein the horizontal stabilizing means includes a rotor attachment that attaches directly to the main propeller, the rotor attachment includes a lower end that is pivotally connected within a joint in a first pivot direction such that when the rotor attachment pivots a predetermined amount with respect to the joint an outside surface defined by the rotor attachment will come into contact with an inside surface defined by the joint thereby preventing the rotor attachment from pivoting more than said predetermined amount; the horizontal stabilizing means further includes a yoke pivotally attached to the joint in a second pivot direction that is different than the first pivot direction and secured to the drive shaft.

8. The aircraft of claim 7 further comprising:
    a reservoir housed within the airframe to store a pressurized fluid that is used by the pneumatic motor mechanism to rotate the propeller.

9. The aircraft of claim 8, wherein the pneumatic motor mechanism includes:
    an intake manifold in communication with the reservoir and having a means to attach to an external pump, which is used to pump air into and pressurize air inside the reservoir; and
    a pneumatic motor in communication with the reservoir and the drive shaft.

10. The aircraft of claim 7, wherein the propeller includes:

a center support defined about the horizontal stabilizing means;

a pair of blades extending outwardly from the center support, each blade having an end distal to the horizontal stabilizing means;

a pair of crossbars extending outwardly from the center support and perpendicularly from the blades, each crossbar have an end distal from the center support; and a safety ring attached to the distal ends of each blade and crossbar.

11. The aircraft of claim 10, wherein the pair of blades are parallel to the first pivot direction and the first pivot direction is perpendicular to the second pivot direction.

12. A self-stabilizing aircraft comprising:

a reservoir for storing a pressurized fluid;

a pneumatic motor mechanism in communication with the reservoir, the pneumatic motor mechanism having a pneumatic motor that uses pressurized fluid contained in the reservoir to rotate a drive shaft;

a horizontal rotatable propeller that is rotated when the drive shaft rotates; and a horizontal stabilizing means attached between the main propeller and the drive shaft, the horizontal stabilizing means pivotally attached to the main propeller in a first pivot direction and pivotally attached to the drive shaft in a second pivot direction, the first pivot direction being parallel to a pair of blades defined by the propeller and the second pivot direction is perpendicular to the first pivot direction, and wherein the horizontal stabilizing means includes a rotor attachment that attaches directly to the main propeller, the rotor attachment includes a lower end that is pivotally connected to a joint in a first pivot direction, and includes a yoke pivotally attached to the joint in a second pivot direction that is different than the first pivot direction and secured to the drive shaft, and further includes a means for preventing the rotor attachment from pivoting more than a predetermined amount.

13. The aircraft of claim 12 further including an inlet assembly in communication with the reservoir, the inlet assembly having a means to permit an external pump to attach thereto, such that the external pump may pump air into and pressurize air inside the reservoir.

14. The aircraft of 13, wherein the main propeller further includes a pair of crossbars perpendicular to the blades and includes a safety ring attached to ends defined by the blades and crossbars, the ends of the blades and crossbars are distal to a center support area that attaches to the horizontal stabilizing means.

15. The aircraft of claim 13, wherein the main propeller includes:

a pair of blades extending outwardly from the horizontal stabilizing means along a horizontal-plane, each blade having a leading edge, a proximal end defined as an end proximal to the horizontal stabilizing means and a distal end;

a safety arc attached to the proximal and distal ends of each blade and positioned in front of the leading edge of each blade; and a pair of flybars extending outwardly from the horizontal stabilizing means along said horizontal plane, each flybar having a weighted end, wherein when the main propeller is rotating and the main propeller begins to pitch, the flybars having an increased centrifugal force created by the rotation thereof will tend to pivot the main propeller in a manner that offsets the pitch such that the helicopter remains in a substantially horizontal position.

* * * * *